(12) United States Patent
Chen et al.

(10) Patent No.: US 8,683,049 B2
(45) Date of Patent: Mar. 25, 2014

(54) METHODS FOR OBTAINING TERMINAL MULTICASTS STATUS

(75) Inventors: Ren Lei Chen, Beijing (CN); Xiao Jun Ma, Beijing (CN); Guang Hua Zhou, Beijing (CN); Jun Li, Cranbury, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 117 days.

(21) Appl. No.: 12/737,095

(22) PCT Filed: Jun. 5, 2009

(86) PCT No.: PCT/EP2009/056953
§ 371 (c)(1),
(2), (4) Date: May 16, 2011

(87) PCT Pub. No.: WO2009/150107
PCT Pub. Date: Dec. 17, 2009

(65) Prior Publication Data
US 2011/0213868 A1 Sep. 1, 2011

(30) Foreign Application Priority Data
Jun. 9, 2008 (EP) .................................... 08305239

(51) Int. Cl.
*G06F 15/16* (2006.01)
(52) U.S. Cl.
USPC ........................................................ 709/227
(58) Field of Classification Search
USPC .............................................. 709/227–229
See application file for complete search history.

(56) References Cited

U.S. PATENT DOCUMENTS

| | | | | |
|---|---|---|---|---|
| 6,151,679 A | * | 11/2000 | Friedman et al. | ................... 726/3 |
| 6,240,513 B1 | * | 5/2001 | Friedman et al. | ............. 713/152 |
| 6,735,201 B1 | * | 5/2004 | Mahajan et al. | ............... 370/390 |
| 7,599,367 B2 | * | 10/2009 | Radhakrishnan et al. | .... 370/390 |
| 7,944,835 B2 | * | 5/2011 | Ahn et al. | ...................... 370/235 |
| 8,059,572 B2 | * | 11/2011 | Kim et al. | ...................... 370/312 |
| 2002/0143951 A1 | * | 10/2002 | Khan et al. | .................... 709/227 |
| 2006/0187928 A1 | * | 8/2006 | McGee et al. | ................. 370/390 |

(Continued)

FOREIGN PATENT DOCUMENTS

| | | |
|---|---|---|
| CN | 1820467 | 8/2006 |
| EP | 1667381 | 6/2006 |
| JP | 2007509518 | 4/2007 |
| WO | WO2005036818 | 4/2005 |

OTHER PUBLICATIONS

Asaeda Keio, "IGMP and MLD Extensions for Mobile Hosts and Routers; draft-asaeda-multimob-igmp-mld-mobility-extensions-00. txt", IETF Standard-Working-Draft, Internet Engineering Task Force, IETF, CHI, Nov. 12, 2007.

(Continued)

*Primary Examiner* — Alicia Baturay
(74) *Attorney, Agent, or Firm* — Tutunjian & Bitetto, P.C.

(57) ABSTRACT

The present invention provides a method for sending a message to a network device with a specific MAC address, in an IP network implementing a interne group management protocol IGMP, comprising: sending, by a network terminal, to the network device, a multicast group management status message including a destination address set as the specific MAC address.

3 Claims, 4 Drawing Sheets

(56) References Cited

U.S. PATENT DOCUMENTS

2007/0002858 A1* 1/2007 Bichot et al. .................. 370/390
2008/0068990 A1* 3/2008 Wu ............................... 370/229
2008/0186896 A1* 8/2008 Fanfelle et al. ............... 370/312
2009/0067840 A1* 3/2009 Bernard et al. ................ 398/67
2009/0141718 A1* 6/2009 Higashida et al. ............ 370/390

OTHER PUBLICATIONS

Limin et al., "An Efficient Multicast Protocol in Mobile ipv6 Networks", Wireless Communications and Networking Conference, 2004, WCNC, vol. 1, Atlanta, GA, Mar. 21-25, 2004, pp. 155-159.
Search Report Dated Sep. 1, 2009.

* cited by examiner

METHODS FOR OBTAINING TERMINAL MULTICASTS STATUS

This application claims the benefit, under 35 U.S.C. §365 of International Application PCT/EP2009/056953, filed Jun. 5, 2009, which was published in accordance with PCT Article 21(2) on Dec. 17, 2009 in English and which claims the benefit of European patent application No. 08305239.9, filed Jun. 9, 2008.

FIELD OF THE INVENTION

The present invention relates in general to a network device and method for obtaining terminal status, and more particularly, to a network device and a method for obtaining terminal status in an IP network for implementing group management protocol.

BACKGROUND OF THE INVENTION

The Internet Group Management Protocol (IGMP) is a typical group management protocol widely employed by multicast multimedia applications in current IP networks, for example, IP TV network television system, IP conference television systems, IP online educational courses etc.

FIG. 1 is a schematic diagram of a typical IP multicast architecture. A multicast routing protocol is used between a local router and a remote router. That protocol can be the Distance Vector Multicast Routing Protocol (DVMRP), the Protocol Independent Multicast-Dense Mode (PIM-DM) or another protocol. IGMP is used between a local router and a plurality of IGMP hosts. It is known that the IGMP hosts can be any user terminal which supports IGMP, such as a set top box (STB), personal computer (PC), Personal Digital Assistant etc.

A typical IGMP host notifies the local router by this protocol that it desires to enter a certain multicast group and receive messages thereof, while the local router periodically queries whether a member of a known group within a local area network is in an active state (i.e. whether there are still some members belonging to a certain multicast group in this network section) to create and maintain membership information in a direct interconnection section of the router. Based on the reports from group members (IGMP hosts), the local router is able to make a decision whether keep continuing forwarding the multicast packets of the group to the attached network or prune the branch by stopping forwarding the multicast packets to the attached network.

Currently, there exist three versions of IGMP for use, IGMPv1, v2 and v3. For IGMPv1 and IGMPv2, the local router only can obtain the state of an entire group to determine whether it is needed to forward the multicast packets to the group, and it is impossible for them to track per-host membership status on a network owing to the duplicate reports suppression which consists of having only one member of a group send a report message, instead of all members replying. This will result in serious bandwidth loss in the video transmissions, because if an IGMP host has left a group, the local router may still transmit the multicast video packets to it owing to the active state of the group.

In order to track per-host membership status on a network, the duplicate reports suppression is cancelled in IGMPv3. That is, when the local router periodically queries whether a member of a known group within a local area network is an active state, each active IGMP host in the group will give a report without suppression.

FIG. 2 is schematic diagram of an IP network showing IGMP Query, report and leave message flow. In the figure, the local router 100 sends an IGMP Query message to the group including hosts 104-1 to 104-3 with forwarding by Ethernet Switches 102-1 to 102-2. Each active host will send a respective report message as a reply. Thus, the router can track per-host membership status on the network.

However, the local router 100 using IGMPv3 can only obtain the state of all hosts in the network, and can not obtain the state of selected hosts. In addition, the Query message is sent in multicast mode and each host will give a multicast response, which will result in bandwidth loss. In addition, the above method can not be used by hosts with the duplicate reports suppression, such as the hosts in IGMPv1 and IGMPv2 networks.

SUMMARY OF THE INVENTION

According to one aspect of the invention, there is provided a method for sending a message to a network device (102-1, 102-2, 202-1, 202-2) with a specific MAC address, in an IP network implementing a internet group management protocol IGMP, comprising: sending, by a network terminal, to the network device (102-1, 102-2, 202-1, 202-2), a multicast group management status message including a destination address set as the specific MAC address.

The invention also concerns a method for obtaining terminal status used in a network device (102-1, 102-1, 202-1, 202-2) connecting with a multicast group including at least one network terminal (404-1, 404-2, 404-3), in an IP network implementing a internet group management protocol, the method comprises: sending, to a network terminal of the multicast group, a multicast group management status message including a destination address set as a specific MAC address of the network terminal.

BRIEF DESCRIPTION OF DRAWINGS

These and other aspects, features and advantages of the present invention will become apparent from the following description in connection with the accompanying drawings.

DETAIL DESCRIPTION OF PREFERRED EMBODIMENTS

A description will now be given with reference to attached figures to illustrate many advantages and features of an embodiment of the present invention.

The term "group membership status" means the status of a network terminal in terms of its activity in a group. If a network terminal is active in a group, it should send an IGMP Report in response to the IGMP query message. In addition, the status of a network terminal in a plurality of groups can be obtained. For example, a network terminal belongs to five groups, and its status in four of them can be active, and in one of them can be 'leave'

Figure 1:
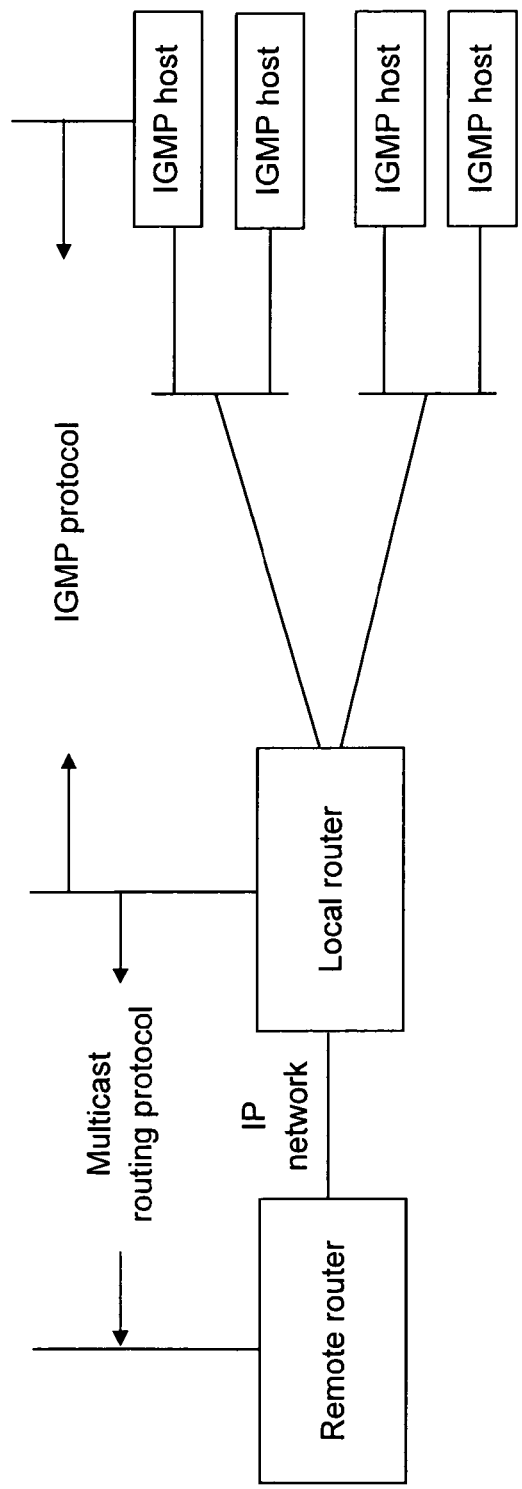
FIG. 1 is a schematic diagram of a typical IP multicast architecture in the prior art.
Figure 2:
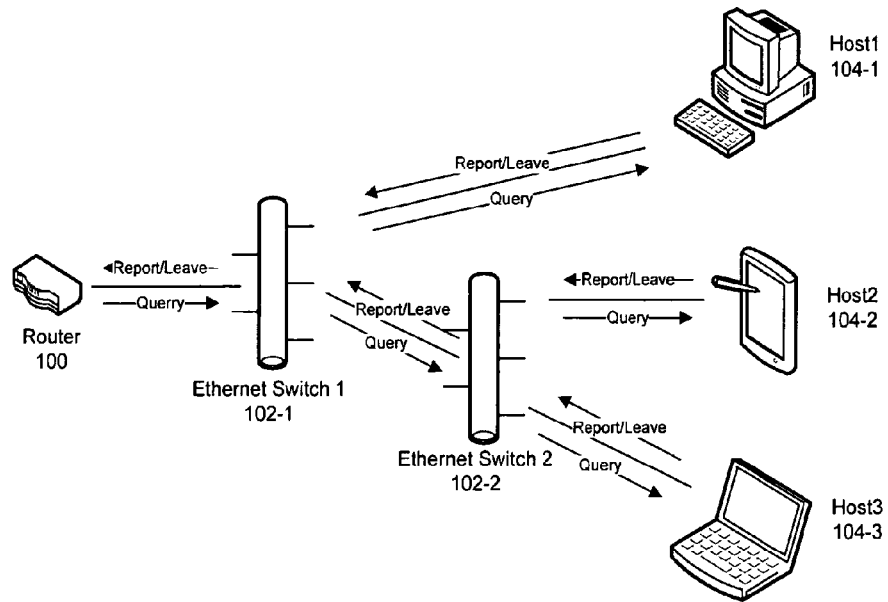
FIG. 2 is schematic diagram of an IP network showing IGMP Query, report and leave message flow according to the prior art.
Figure 3:
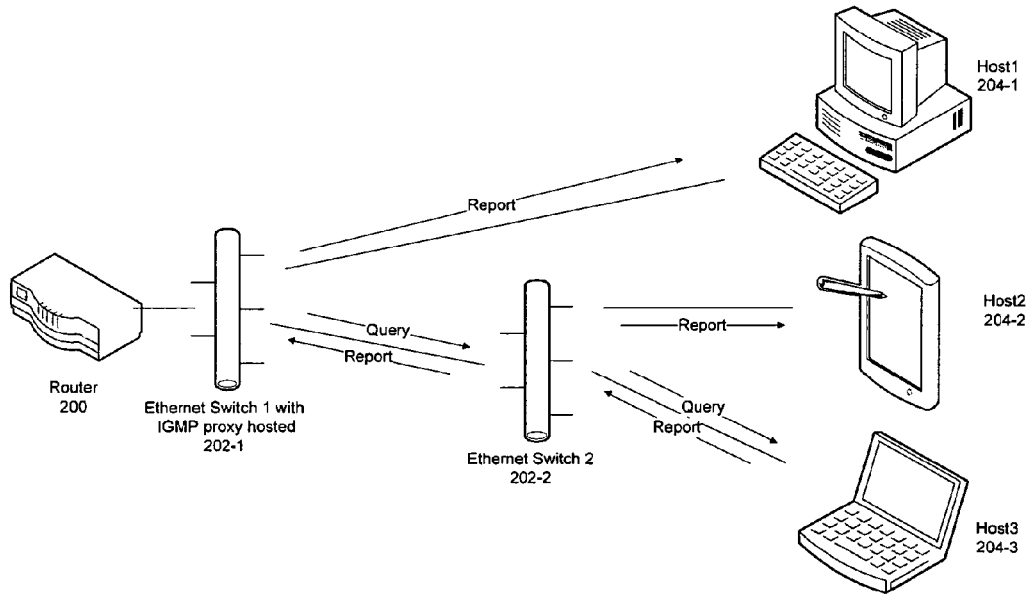
FIG. 3 is schematic diagram of an IP network showing IGMP query/report message flow in accordance with an embodiment of the present invention.

FIG. 3 is schematic diagram of an IP network showing IGMP query/report message flow in accordance with an embodiment of the present invention. In the embodiment, an IGMP proxy is hosted in Ethernet Switch 202-1 for establishing a table to list the relationship of the hosts and the multicast groups. That is, the table lists the multicast groups and the corresponding hosts therein. The Ethernet Switch 202-1 is connected with host 204-1 via a user interface (not shown in FIG. 3), and is connected with hosts 204-2 and 204-3 via a user interface through Ethernet Switch 202-2.

It is known to one skilled in the art that the router 200, Ethernet Switches 202-1 and 202-2, and network access device all can be considered as network devices for accessing the IP network used by the network terminals.

In the embodiment of the invention, the IGMP proxy send a multicast group management status message to host 204-3 through Ethernet Switches 202-2 to query the group membership status of the host 204-3, that is the status of the host 204-3 in a specific group of a plurality of groups it belongs to. In the multicast group management status message, a destination address is set as a specific MAC address of the host 204-3. Then after receiving the multicast query message, the host 204-3 will reply with a report to the IGMP proxy. Please note that the replied report from host 204-3 will be forwarded to other hosts in its group according to the IGMP protocol.

A report message means the host in the group is still alive. Based on the reply, the IGMP proxy can update the table therein. In addition, if the host 204-3 will leave one group of the plurality of groups, it can send a leave message to the IGMP proxy, and then the proxy will register a leave state and update the table.

As described above, the Ethernet Switch 202-1 can be connected with a plurality of hosts in corresponding multicast groups. Actually the IGMP proxy hosted in the Ethernet Switch 202-1 sends the query message to the hosts based on the above mentioned table no matter what the state of the group is. That is, sometimes there is only one host in a group which is connecting with the Ethernet Switch 202-1, or even there is no host in a group currently.

Using the above mode, the IGMP proxy can repeatedly sends IGMP membership Query message to each host respectively, such as by a predetermined period or required interval, so as to obtain a report message from the host and update the table. In each round for a multicast group, after sending the query message to a host, the IGMP proxy will wait a predetermined period, and then send the query messages to other hosts according to the embodiment. The predetermined period can be at least the response time of the host, so that the situation will be avoided that after receiving the query messages from the IGMP proxy and response message from the first host, other hosts will suppress their responses. This situation will occur in the network of IGMPv1 and IGMPv2, because the host suppression is not cancelled. For example, if there are three hosts A, B and C, a query message to host A is sent firstly, then after a period of at least the max response time, a query message to host B is sent out. At last, a query message is sent to host C after another predetermined period.

The max response period is a period that the host sends a response, and after this period, the host is not allowed to send a response.

Thus, when the router 200 sends a Query message to the Ethernet Switch 202-1, the IGMP proxy can send a report based on the table as a reply to the router 200 immediately, and does not need to send this Query message again to the hosts. The unicast manner will be described in detail later.

Alternatively, the IGMP proxy can sends IGMP membership Query message in unicast mode selectively to some of the hosts, that is, at least one host to obtain the membership status of the selected hosts.

Although the above embodiment has an IGMP proxy hosted in Ethernet Switch 202-1, it is known to one skilled in the art that the IGMP proxy can host in other Ethernet Switch or even in the router 200. That is, the IGMP proxy can be used by any network device such as router, Ethernet switch or network access point etc. to obtain the terminal status in the network. The IGMP proxy can be a protocol processing unit for listing a table and forwarding message between the network device and the network terminals. The protocol processing unit can be implemented by software, hardware or their combination.

Figure 4:
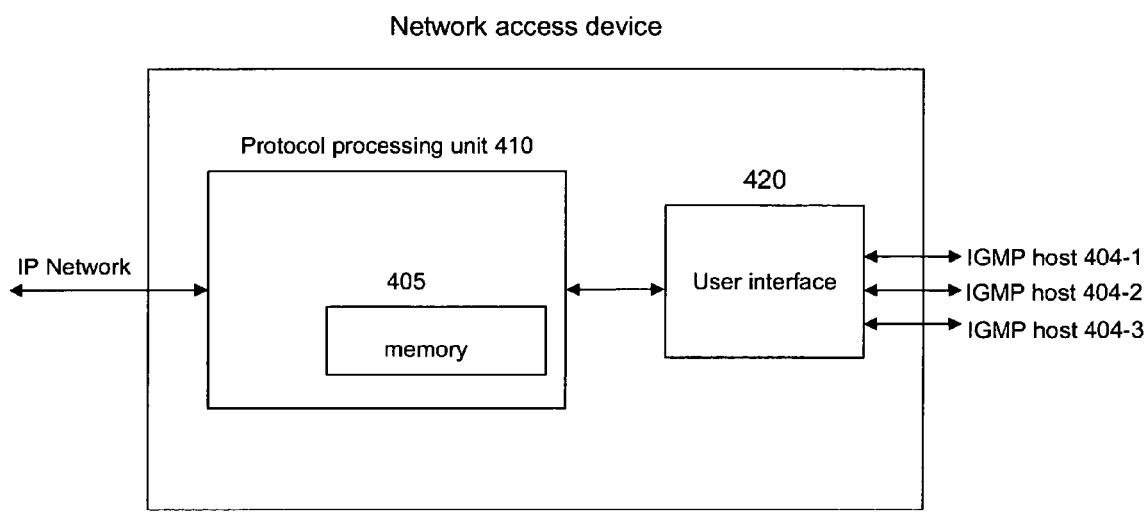
FIG. 4 is a block diagram of the network device according to the embodiments of the invention.

FIG. 4 is a block diagram of the network device according to the embodiment. In FIG. 4, the network device includes a protocol processing unit 410 and user interface 420. The protocol processing unit 410 communicates with the upper network device in the IP network, and connected with IGMP hosts 404-1 to 3 via the user interface 420. In addition, the protocol processing unit includes a memory 405 to store a table to list the relationship of the hosts and the multicast groups.

Figures 5A, 5B:
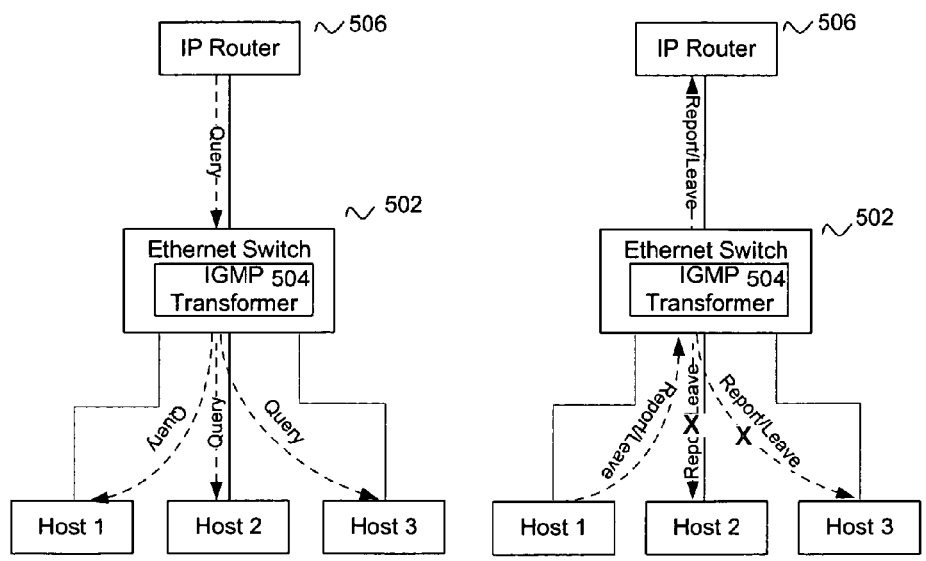
FIG. 5 is schematic diagram of an IP network showing IGMP query/report message flow in accordance with another embodiment of the present invention.

FIG. 5 is schematic diagram of an IP network showing IGMP query/report message flow in accordance with another embodiment of the present invention. As shown in FIG. 5, an IGMP transformer 504 is implemented and integrated into the Ethernet Switch 502. It is known that the IGMP transformer 504 can be integrated into the hosts 1-3 or the IP router 506, or even the IGMP transformer 504 can be implemented as a function block of respective hosts, switch and router.

According to the embodiment, the IGMP transformer 504 can intercept all IGMP messages on the Ethernet switch. For each multicast management status query message from IP router 506 to the multicast group including hosts 1-3, the IGMP transformer 504 registers the MAC address of the IP Router 506 which originates the query message as the source address for the group. Then for Report/Leave messages from respective hosts, IGMP transformer 504 will change the MAC address from the multicasting MAC address of the group to a specific MAC address—the source address of the IP router 506.

Note that the IP Router can be real router or any network device that can act as an IGMP proxy.

Figure 6:
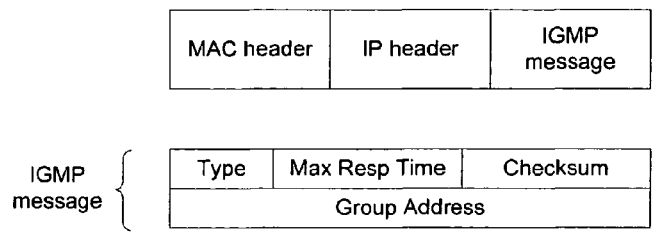
FIG. 6 is a diagram of an IGMP message format transmitted in the network according to the embodiment of FIG. 3.

FIG. 6 is a diagram of an IGMP message format transmitted between the router 200 and the Ethernet Switch 202-1 in the network, or the IGMP message format transmitted between the IP router 506 and the hosts 1-3. The IGMP message shall be encapsulated in a MAC frame which contains a MAC header and IP header for each transmission, as shown in the Figure. The detailed IGMP message format is as follows:

There are four fields, Type, Max Resp Time, Checksum and Group Address in the message format.

For the Type field, there are three types of messages concerning host-router interaction. The three message types are Member Query, Membership Report, Leave Group. For simplicity, the three messages are referred to as Query, Report and Leave messages.

There are two sub-types of Membership Query messages:
General Query, used to learn which groups have members on an attached network.
Group-Specific Query, used to learn if a particular group has any members on an attached network.

The General Query and Group-Specific Query messages are differentiated by the Group Address. The group address field is set to zero when sending a General Query, and set to the group address being queried when sending a Group-Specific Query.

The Max Response Time field is meaningful only in Membership Query messages, and specifies the maximum allowed time before sending a responding report in units of 1/10 second.

Coming back to FIG. 3, the router 200 periodically sends General Queries on each attached network to learn which groups have members on an attached network, and/or sends Group-Specific Queries on each attached network to learn if a particular group has any members on the attached network. According to the embodiment of the invention, the IGMP proxy will reply to the router 200 immediately based on the table thereof, and then discard the Query message. It will not be forwarded to all the hosts by the Ethernet Switch 202-1.

Figure 7:
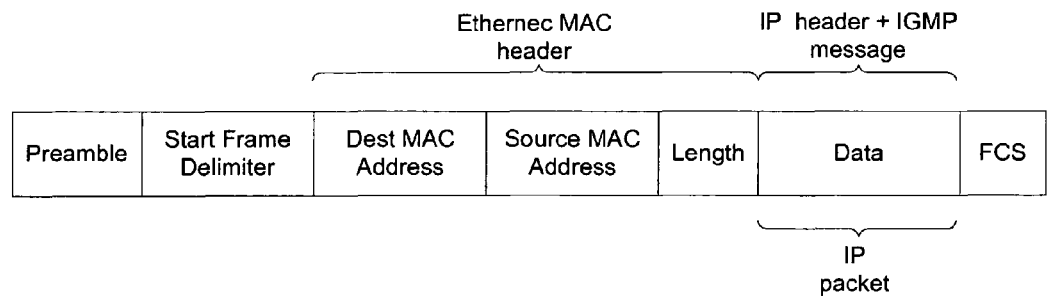
FIG. 7 is a diagram for illustrating a MAC frame format of the IGMP message in accordance with the embodiment of the present invention.

The message transmission between the Ethernet Switch 202-1 and the hosts will be described with reference to FIG. 7. FIG. 7 is a diagram for illustrating the MAC frame format of the IGMP message in accordance with the embodiments of the present invention.

In order to send the Query message to each individual host in unicast mode, the destination MAC address shall be changed into a specific host MAC address. As shown in FIG. 6, the IGMP Query message with the format shown in FIG. 5 is encapsulated into an IP packet to form the Data field, and then the Data field is added with an Ethernet MAC head, termed as Ethernet MAC frame.

In the Ethernet MAC head, there is a field, 'Dest MAC Address', for identifying the destination that the IGMP message will be routed to. Note that for an IGMP Query in the prior art, the contained Dest MAC Address is the multicast MAC address corresponding to the group address. In order to accomplish the multicast over unicast, the contained Dest MAC Address is changed to a specific host MAC Address, and the Source MAC Address is the IGMP Proxy's MAC address, whereas other fields remain the same as a general IGMP Query.

After one of the hosts receives the Query message sent in unicast mode, only this one host give a report message to the Ethernet Switch 202-1, and the report message will also be forwarded by the Ethernet Switch 202-1 to other hosts in the group. Since the other hosts do not receive a Query message before, they will not send a report message to the Ethernet Switch 202-1. Therefore, using the unicast mode, the Ethernet Switch can obtain the status of one host and update the table in the IGMP proxy.

In addition to the Query message, the table of the IGMP message can be updated as follows: when a host joins a multicast group, it should immediately transmit an unsolicited Membership Report for that group, in case it is the first member of that group on the network.

When a host leaves a multicast group, if it was the last host to reply to a Query with a Membership Report for that group, it should send a Leave Group message to the all-routers multicast group. If it was not the last host to reply to a Query, it may or may not be necessary send out the Leave Group message.

According to the second embodiment of the invention, the Destination MAC Address of the report message is changed to a specific MAC Address of the IP router, and the Source MAC Address is the host's MAC address, so that only the IP router can receive the report message, and other hosts in the multicast group do not need to receive the report message. Thus the bandwidth of the network will be used effectively.

As described above, with the method and devices in the embodiment of the invention, the router can track the status of each individual host.

Although the embodiment of the invention is described based on IGMP protocol between the router and the hosts, other protocol for group management shall all be used to implement the invention.

The foregoing merely illustrates one embodiment of the invention and it will thus be appreciated that those skilled in the art will be able to devise numerous alternative arrangements which, although not explicitly described herein, embody the principles of the invention and are within its spirit and scope.

The invention claimed is:

1. A method for sending a modified internet group management protocol (IGMP) message from a network terminal to a network device with a specific MAC address, in an IP network implementing an internet group management protocol, comprising, at the side of the terminal, the steps of:
receiving an IGMP query message for a first multicast group from the network device that originates the IGMP query message, wherein the first multicast group corresponds to a first multicasting MAC address;
sending, by the network terminal in the first multicast group to the network device, a modified IGMP report message, wherein a destination address of the modified IGMP report message is set as the specific MAC address, wherein the specific MAC address is different than the first multicasting MAC address.

2. The method according to claim 1, wherein the method further comprises:
sending a modified IGMP leave message, wherein a destination address of the modified IGMP leave message is set as the specific MAC address which is different than the first multicasting MAC address.

3. The method according to claim 1, wherein the received IGMP query message is a modified IGMP message and the destination address of the IGMP query message is the MAC address of the terminal which is different than the first multicasting MAC address.

* * * * *